United States Patent
Shimomura et al.

(10) Patent No.: US 8,472,480 B2
(45) Date of Patent: Jun. 25, 2013

(54) SPREAD CODE ALLOCATING METHOD, DESPREADING METHOD, TRANSMITTING DEVICE, RECEIVING DEVICE, COMMUNICATING DEVICE, WIRELESS BASE STATION DEVICE, AND MOBILE TERMINAL DEVICE

(75) Inventors: Tsuyoshi Shimomura, Kawasaki (JP); Dai Kimura, Kawasaki (JP); Tetsuya Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 13/157,947

(22) Filed: Jun. 10, 2011

(65) Prior Publication Data
US 2011/0249704 A1   Oct. 13, 2011

Related U.S. Application Data

(63) Continuation of application No. 11/808,999, filed on Jun. 14, 2007, now Pat. No. 8,023,531, which is a continuation of application No. PCT/JP2004/018661, filed on Dec. 14, 2004.

(51) Int. Cl.
  *H04J 4/00* (2006.01)
  *H04B 1/707* (2011.01)
(52) U.S. Cl.
  USPC .......................... 370/478; 375/141
(58) Field of Classification Search
  USPC ............... 370/203, 208, 464, 478; 455/91, 455/101
  See application file for complete search history.

(56) References Cited

U.S. PATENT DOCUMENTS

| | | |
|---|---|---|
| 6,324,206 B1 | 11/2001 | Rotstein et al. |
| 6,496,474 B1 | 12/2002 | Nagatani et al. |
| 6,507,576 B1 | 1/2003 | Suzuki et al. |
| 6,512,753 B1 | 1/2003 | Kim et al. |
| 6,532,250 B1 | 3/2003 | Palenius et al. |

(Continued)

FOREIGN PATENT DOCUMENTS

| | | |
|---|---|---|
| CN | 1267966 A | 9/2000 |
| EP | 1 039 653 A2 | 9/2000 |

(Continued)

OTHER PUBLICATIONS

The State Intellectual Property Office of China "2nd Notification of Office Action" issued for corresponding Chinese Patent Application No. 200480044600.2 issued Dec. 31, 2010. Full English translation attached.

(Continued)

*Primary Examiner* — Chi Pham
*Assistant Examiner* — Robert Lopata
(74) *Attorney, Agent, or Firm* — Myers Wolin, LLC

(57) ABSTRACT

A communication system, including a transmitter that transmits a signal by using a two-dimensional spread code used for making a spread in time and frequency directions and a receiver that receives the signal transmitted from the transmitter, where the transmitter includes a selecting unit that selects spread codes in which at least one of the time and the frequency directions are mutually orthogonal, and a transmitting unit that spreads a signal by using the selected spread codes and transmits the signal, where each of the selected spread codes are able to be split in two or more parts, which are mutually orthogonal with the same parts of other selected spread codes in at least one of the time and the frequency directions.

1 Claim, 27 Drawing Sheets

U.S. PATENT DOCUMENTS

| | | | |
|---|---|---|---|
| 6,999,467 B2 | 2/2006 | Krauss et al. | |
| 7,002,899 B2 * | 2/2006 | Azenkot et al. | 370/208 |
| 7,092,431 B2 | 8/2006 | Maeda et al. | |
| 7,161,895 B1 | 1/2007 | Sudo | |
| 7,197,007 B2 * | 3/2007 | Yang et al. | 370/208 |
| 7,242,722 B2 | 7/2007 | Krauss et al. | |
| 7,302,238 B2 * | 11/2007 | Fujil | 455/101 |
| 7,386,029 B2 | 6/2008 | Hoshino et al. | |
| 7,420,915 B2 | 9/2008 | Murakami et al. | |
| 7,436,758 B2 | 10/2008 | Suh et al. | |
| 7,551,546 B2 | 6/2009 | Ma et al. | |
| 7,580,346 B2 * | 8/2009 | Azenkot et al. | 370/208 |
| 7,620,420 B2 | 11/2009 | Higuchi et al. | |
| 2002/0003834 A1 | 1/2002 | Yoshimura | |
| 2002/0159470 A1 | 10/2002 | Atarashi et al. | |
| 2003/0053413 A1 | 3/2003 | Sawahashi et al. | |
| 2003/0185179 A1 | 10/2003 | Inogai et al. | |
| 2004/0028007 A1 | 2/2004 | Sumasu et al. | |
| 2004/0042386 A1 | 3/2004 | Uesugi et al. | |
| 2005/0084000 A1 | 4/2005 | Krauss et al. | |
| 2006/0007892 A1 | 1/2006 | Sudo | |
| 2007/0097851 A1 | 5/2007 | Adachi | |
| 2007/0165700 A1 | 7/2007 | Shin et al. | |
| 2008/0225820 A1 | 9/2008 | Atarashi et al. | |

FOREIGN PATENT DOCUMENTS

| | | |
|---|---|---|
| JP | 2000-332724 A | 11/2000 |
| JP | 3236273 B1 | 9/2001 |
| JP | 2003-46474 A | 2/2003 |
| JP | 2003-046481 A | 2/2003 |
| JP | 2004-48117 A | 2/2004 |

OTHER PUBLICATIONS

Japanese Patent office "Notice of Rejection Ground" issued for corresponding Japanese Patent Application No. 2006-548604, mailed Aug. 4, 2009. English translation attached.

Y. Kishiyama, et al., "Investigation of Pilot Channel Structure for VSF-OFCDM Broadband Wireless Access," Technical Report of IEICE, vol. 102, No. 373, RCS2002-169.

C. Yang, et al., "2D Orthogonal Spreading Codes for Multi-carrier DS-CFMA Systems," IEEE International Conference on Communications, 2003, ICC 2003, vol. 5, pp. 3277-3281.

N. Maeda, et al., "VSF-OFCDM Using Two-Dimensional Spreading and Its Performance," Technical Report of IEICE, vol. 102, No. 86, RCS2002-61.

United States Patent Office "Non-Final Office Action" issued for corresponding U.S. Appl. No. 11/808,999, dated Sep. 30, 2009.

United States Patent Office "Non-Final Office Action" issued for corresponding U.S. Appl. No. 11/808,999, dated Oct. 18, 2010.

United States Patent Office "Final Office Action" issued for corresponding U.S. Appl. No. 11/808,999, dated Jun. 14, 2010.

* cited by examiner

| $C_1$ | 0 | | | | | | | | | | | | | | | |
|---|---|---|---|---|---|---|---|---|---|---|---|---|---|---|---|---|
| $C_2$ | 0 | | | | | | | | 1 | | | | | | | |
| $C_4$ | 0 | | | | 1 | | | | 2 | | | | 3 | | | |
| $C_8$ | 0 | | 1 | | 2 | | 3 | | 4 | | 5 | | 6 | | 7 | |
| $C_{16}$ | 0 | 1 | 2 | 3 | 4 | 5 | 6 | 7 | 8 | 9 | 10 | 11 | 12 | 13 | 14 | 15 |

| $C_1$ | $C_2$ | $C_4$ | $C_8$ | $C_{16}$ | | |
|---|---|---|---|---|---|---|
| 0 | 0 | 0 | 0 | 0 | $C_{2,0} \times C_{2,0}$ | $C_{1,0} \times C_{2,1}$ |
| | | | | 1 | | |
| | | | 1 | 2 | | |
| | | | | 3 | | |
| | | 1 | 2 | 4 | | |
| | | | | 5 | | |
| | | | 3 | 6 | | |
| | | | | 7 | | |
| | 1 | 2 | 4 | 8 | $C_{4,2} \times C_{2,0}$ | |
| | | | | 9 | | |
| | | | 5 | 10 | | |
| | | | | 11 | | |
| | | 3 | 6 | 12 | $C_{8,6} \times C_{4,0}$ | $C_{4,3} \times C_{4,1}$ |
| | | | | 13 | | |
| | | | 7 | 14 | $C_{16,14} \times C_{4,0}$ | |
| | | | | 15 | $C_{16,15} \times C_{4,0}$ | |

F I G. 1

|   | f | → |   |   |
|---|---|---|---|---|
| t | 0 | 0 | 1 | 1 |
| ↓ | 1 | 1 | 0 | 0 |
|   | 1 | 1 | 0 | 0 |
|   | 0 | 0 | 1 | 1 |

FIG. 2A

| 0 | 0 | 1 | 1 |
|---|---|---|---|
| 1 | 1 | 0 | 0 |
| 1 | 1 | 0 | 0 |
| 0 | 0 | 1 | 1 |

FIG. 2B

| 0 | 0 | 1 | 1 |
|---|---|---|---|
| 1 | 1 | 0 | 0 |
| 1 | 1 | 0 | 0 |
| 0 | 0 | 1 | 1 |

FIG. 2C

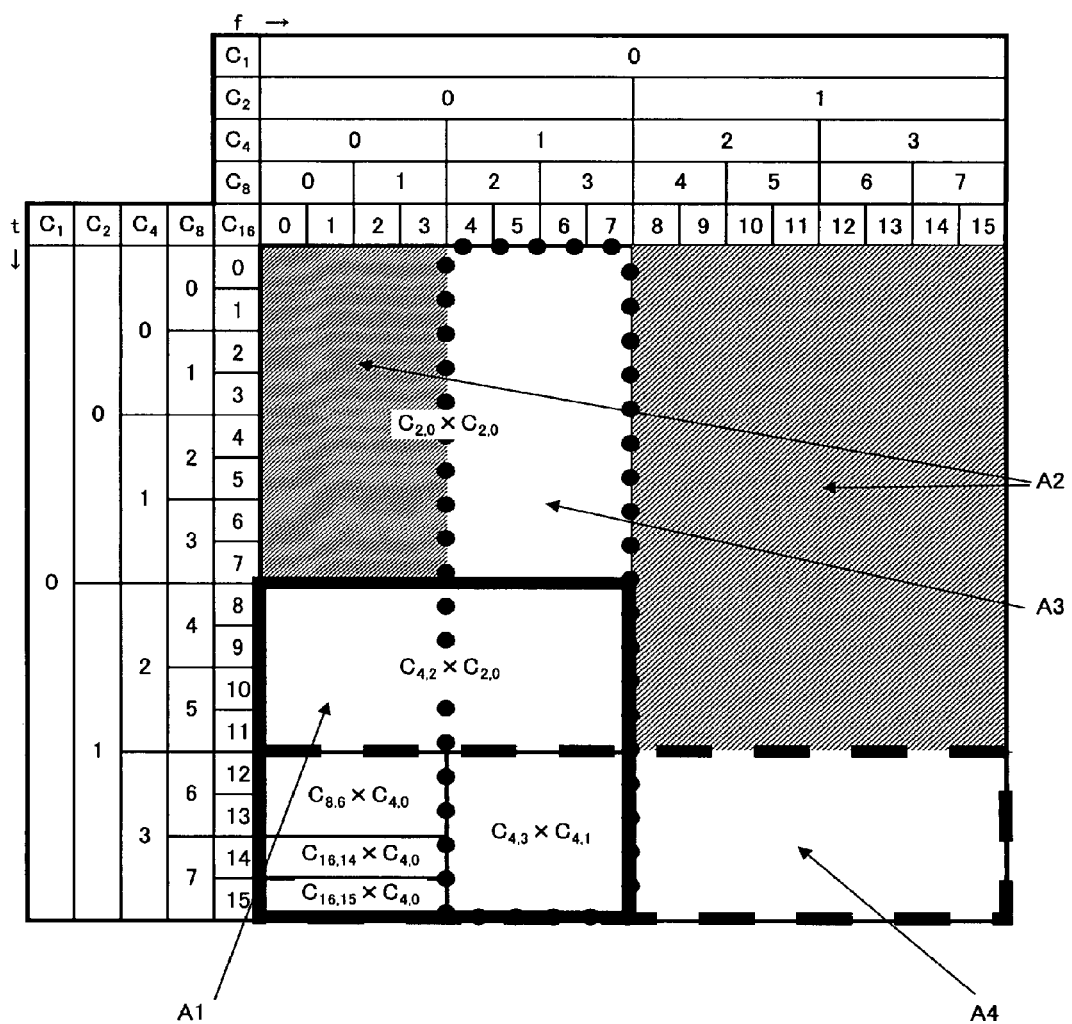
F I G. 3

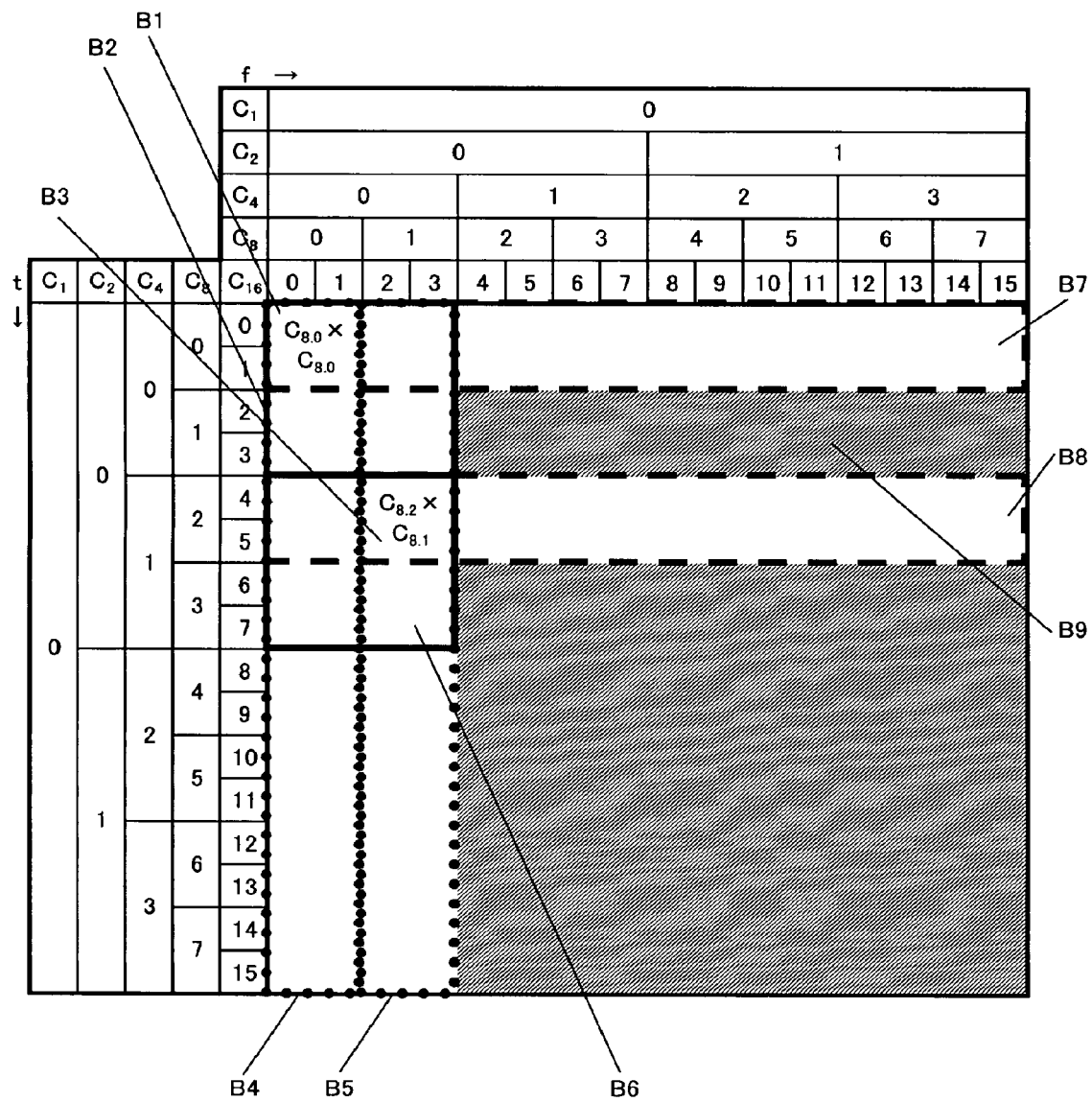
F I G. 4

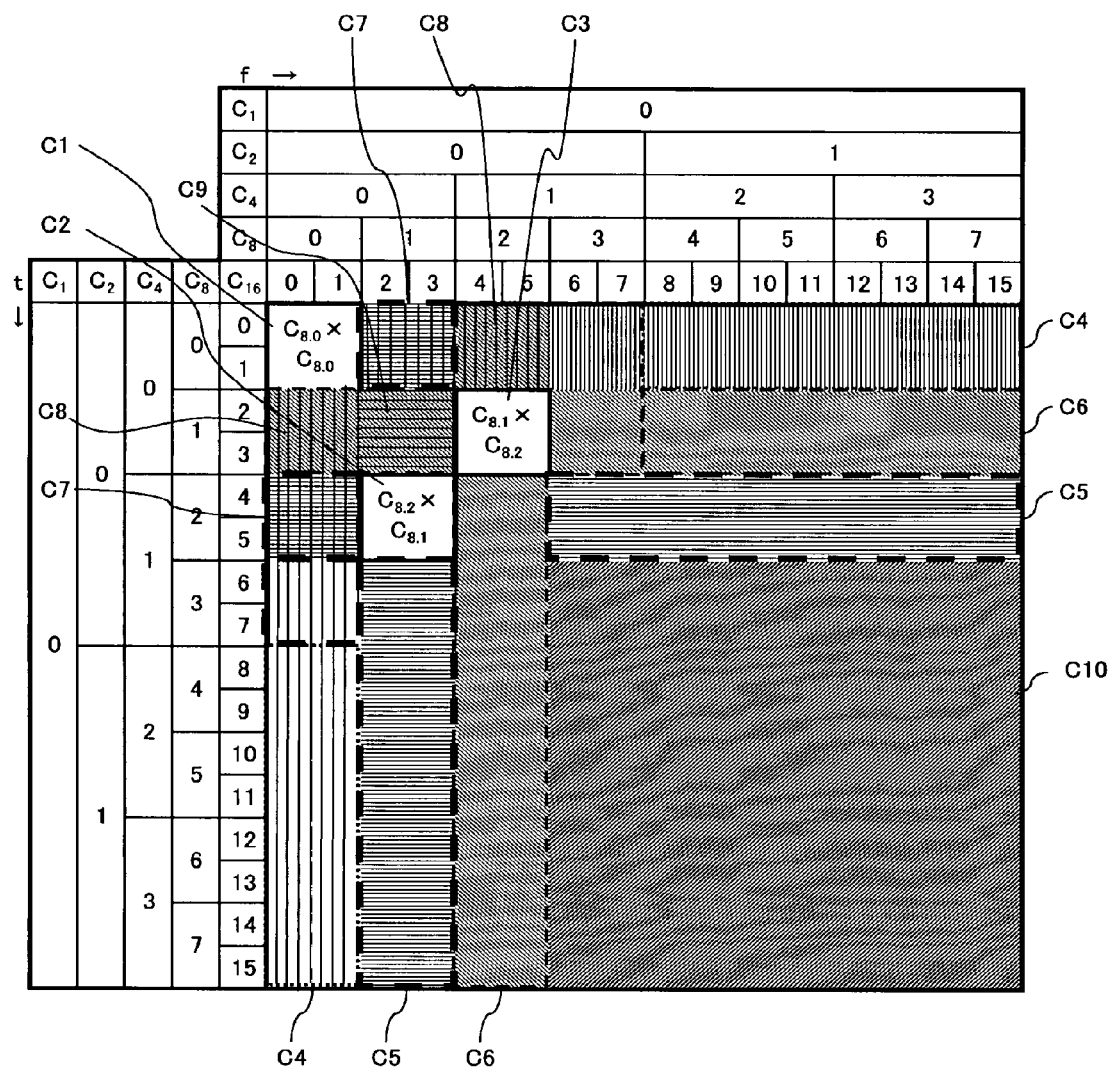
F I G. 5

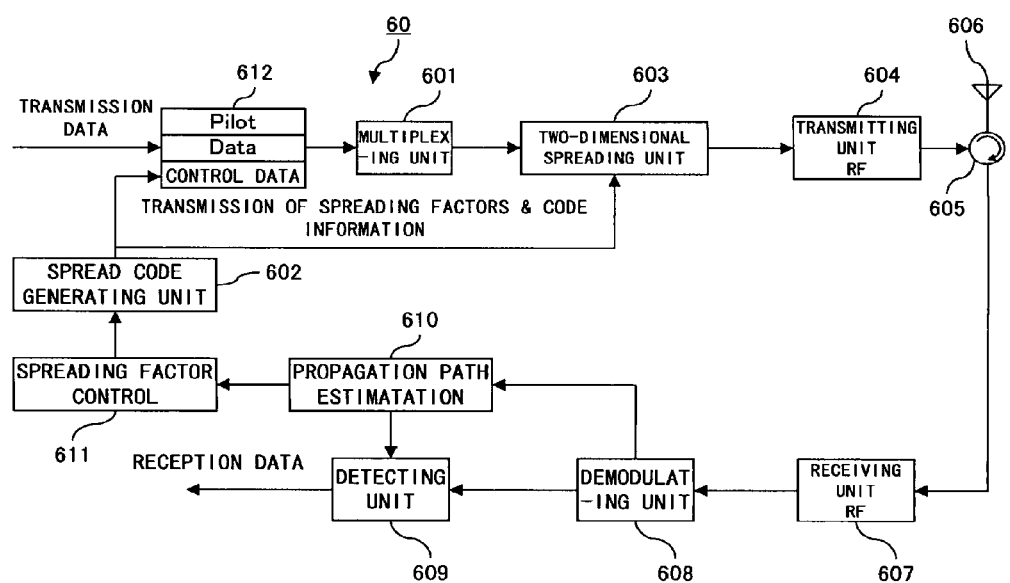
F I G. 6

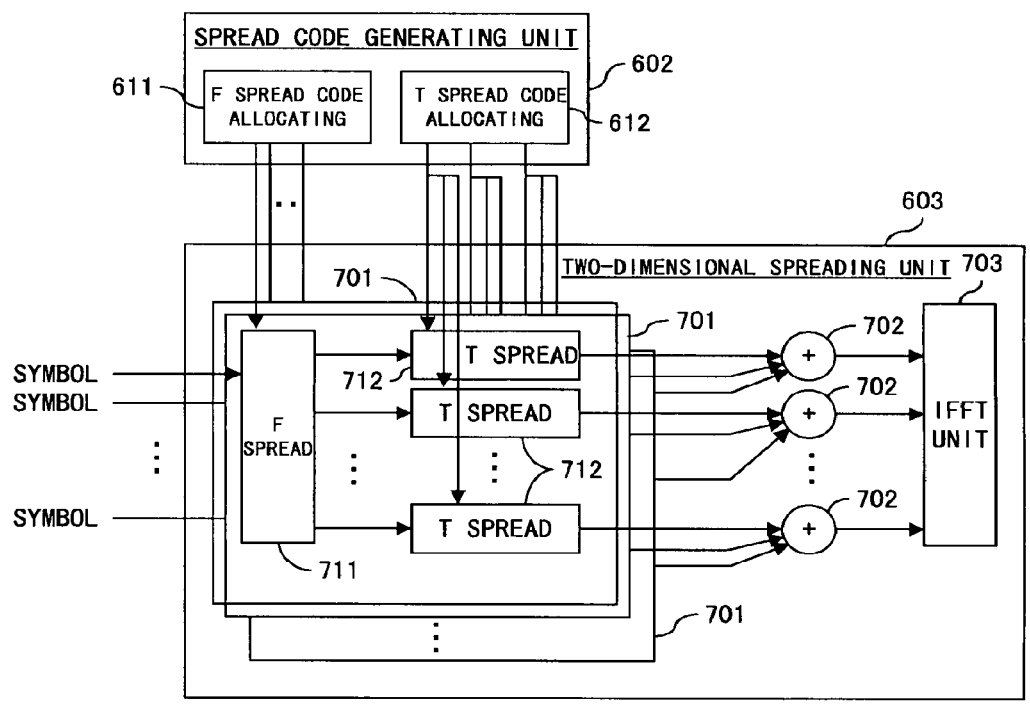
F I G. 7

| CHANNEL TYPE | USED SPREAD CODE |
|---|---|
| SHARED PILOT | C(4,3) × C(4,1) |
| CONTROL A | C(4,0) × C(4,0) |
| CONTROL B | C(8,2) × C(4,0) |
| DATA A | {C(2,0) × C(2,1)} or<br>{C(4,0) × C(2,1), C(4,1) × C(2,1)} or<br>{C(4,0) × C(2,1), C(4,1) × C(4,2), C(4,1) × C(4,3)} or<br>{C(4,0) × C(2,1), C(4,1) × C(4,2), C(8,2) × C(4,3), C(8,3) × C(4,3)} or<br>... |
| DATA B | {C(4,2) × C(4,2)} or<br>{C(8,4) × C(4,2), C(8,5) × C(4,2)} or<br>{C(8,4) × C(8,4), C(8,4) × C(8,5), C(8,5) × C(8,4), C(8,5) × C(8,5)} or<br>... |
| DATA C | {C(8,4) × C(4,3)} or<br>{C(8,4) × C(8,6), C(8,4) × C(8,7)} or<br>{C(16,8) × C(4,3), C(16,9) × C(4,3)} or<br>... |

FIG. 8

| CHANNEL TYPE | USED SPREAD CODE |
|---|---|
| SHARED PILOT | C(4,3) × C(4,1) |
| CONTROL A | C(4,0) × C(4,0) |
| CONTROL B | C(8,2) × C(4,0) |
| DATA A (SF 4×4) | C(4,0) × C(4,2), C(4,0) × C(4,3), C(4,1) × C(4,2), C(4,1) × C(4,3) |
| DATA B (SF 4×16) | C(4,2) × C(16,8), C(4,2) × C(16,9), C(4,2) × C(16,10), C(4,2) × C(16,11) |
| DATA C (SF 32×4) | C(32,16) × C(4,3), C(32,17) × C(4,3), C(32,18) × C(4,3), C(32,19) × C(4,3) |

F I G. 9

| CHANNEL TYPE | OCCUPIED CODE AREA |
|---|---|
| SHARED PILOT | C(2,1) × C(2,0), C(2,0) × C(4,1), C(4,3) × C(2,1) |
| CONTROL A | C(4,0) × C(4,0) |
| CONTROL B | C(8,2) × C(4,0) |
| DATA A | C(2,0) × C(2,1) |
| DATA B | C(4,2) × C(4,2) |
| DATA C | C(8,4) × C(4,3) |

F I G. 1 0

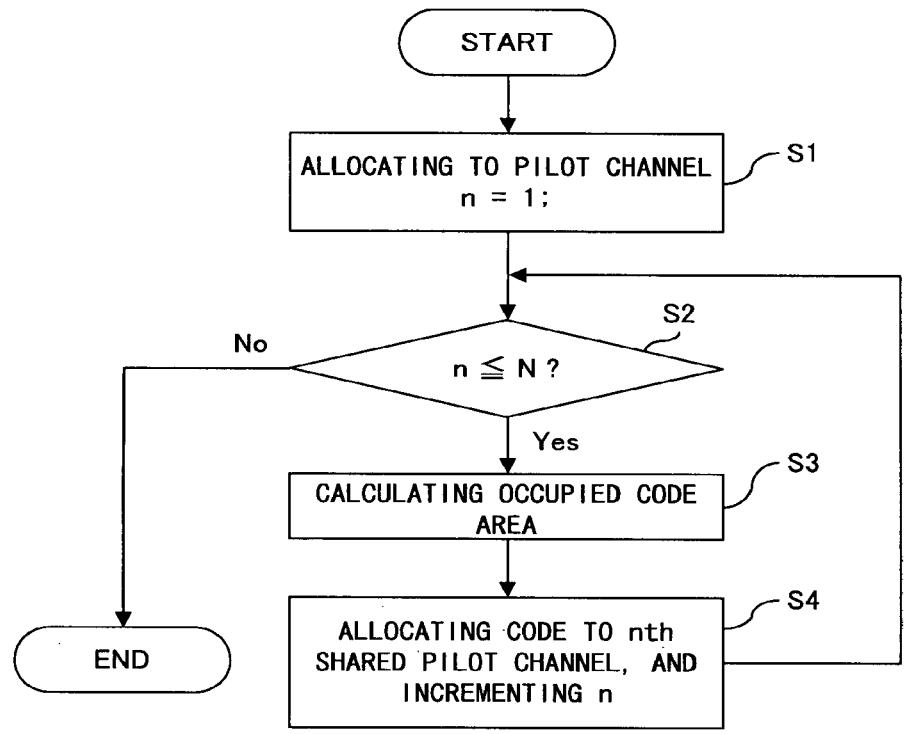
F I G. 1 1

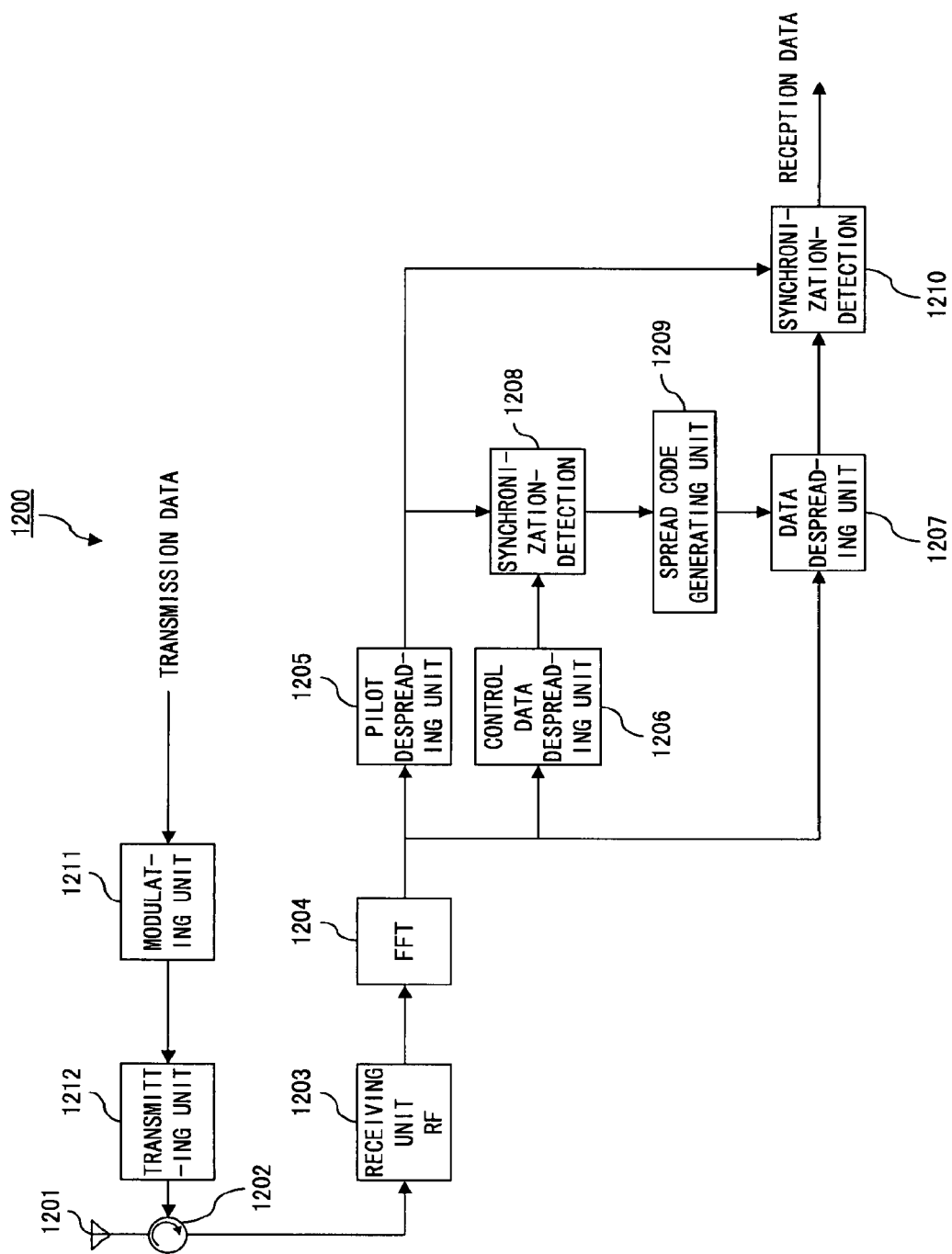
F I G. 12

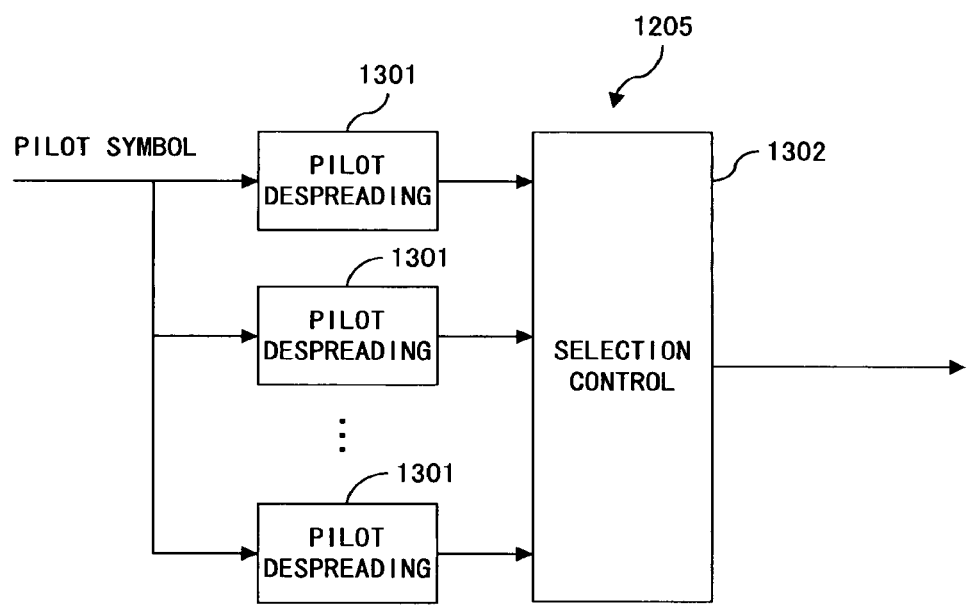
F I G. 13

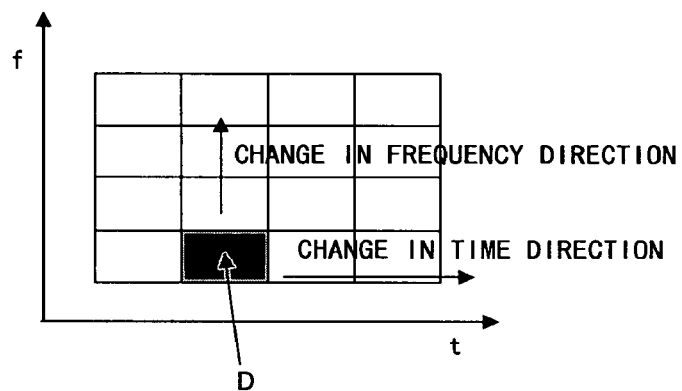
F I G. 1 4

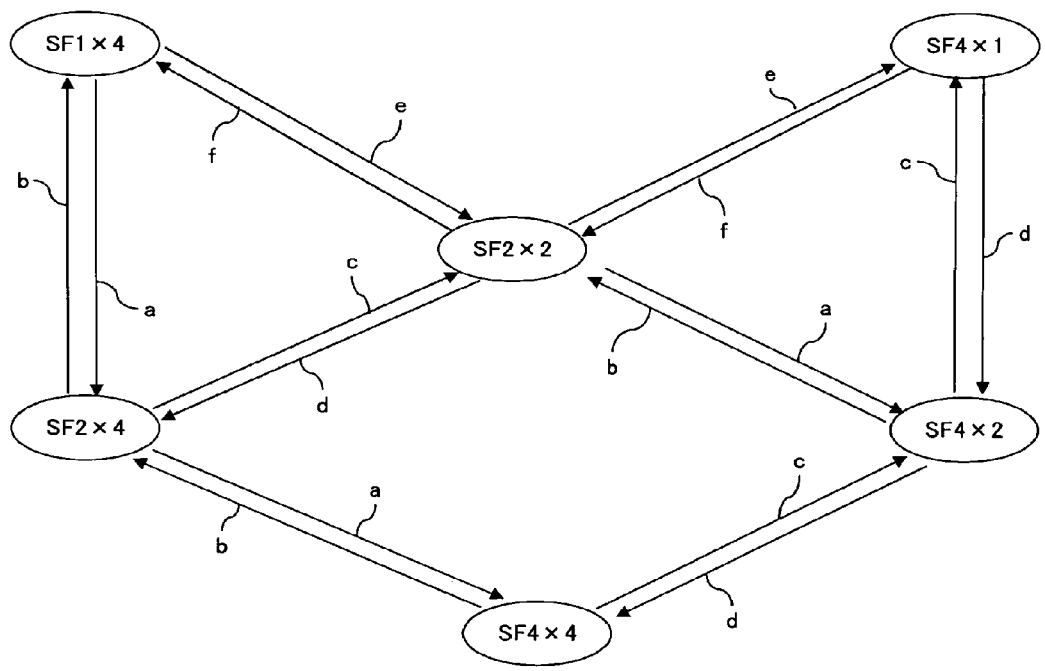
F I G. 1 5

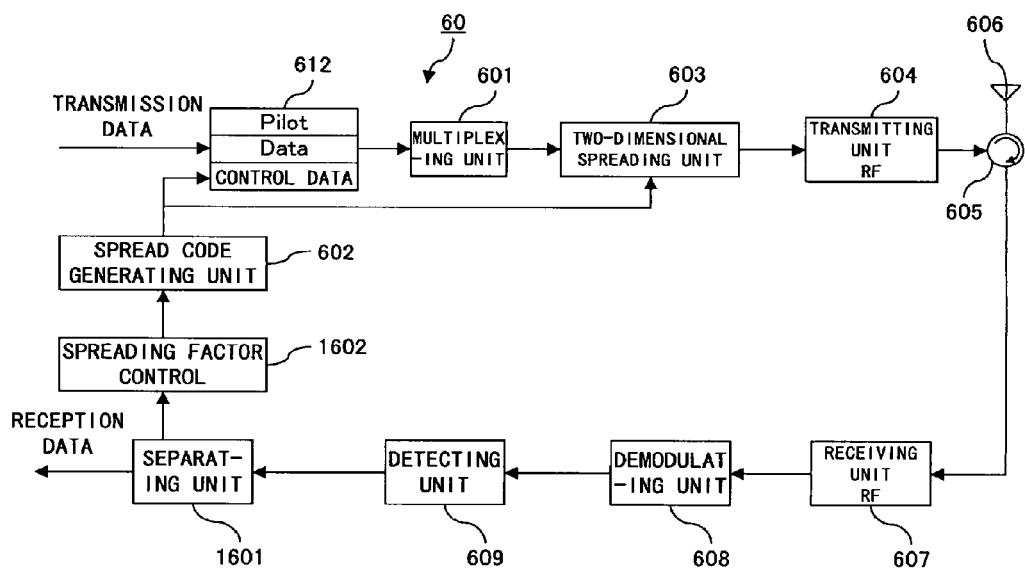
F I G. 16

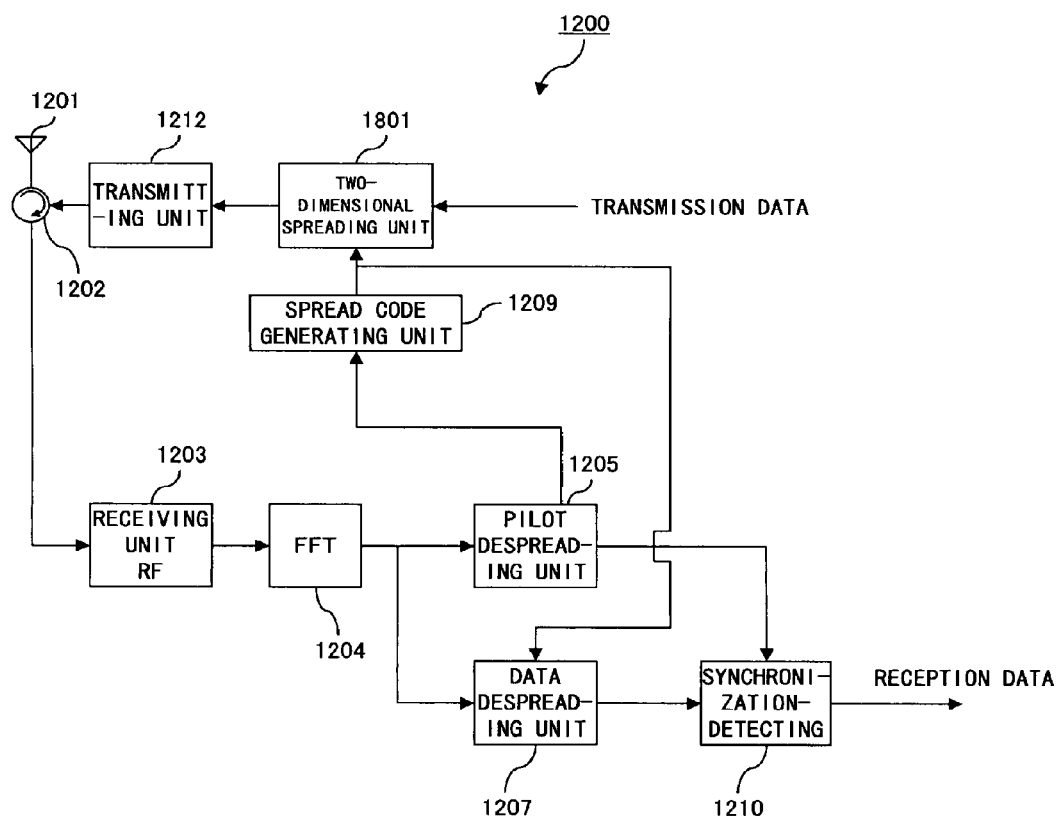
F I G. 1 8

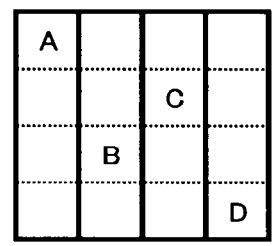
F I G. 2 2 A

F I G. 2 2 C

SPREAD CODE ALLOCATING METHOD, DESPREADING METHOD, TRANSMITTING DEVICE, RECEIVING DEVICE, COMMUNICATING DEVICE, WIRELESS BASE STATION DEVICE, AND MOBILE TERMINAL DEVICE

CROSS REFERENCE TO RELATED APPLICATIONS

This present application is a continuation of U.S. application Ser. No. 11/808,999, filed Jun. 14, 2007, now pending, which is a continuation of international application number PCT/JP2004/018661, which was filed on Dec. 14, 2004, the contents of each are herein wholly incorporated by reference.

BACKGROUND OF THE INVENTION

1. Field of the Invention

The present invention relates to a technique for transmitting/receiving data in units of channels by using a two-dimensional spread code with which spreading is made in a time direction and a frequency direction.

2. Description of the Related Art

In recent years, in a mobile communication field, attention has been focused on, for example, an OFDM-CDMA method, into which an OFDM (Orthogonal Frequency Division Multiplexing) modulation method and a CDMA (Code Division Multiple Access) method are combined, as a multi-carrier modulation method. The OFDM modulation method is a modulation method having a high frequency use efficiency utilizing a plurality of mutually orthogonal subcarriers, whereas the CDMA method is a modulation method using a spread spectrum communication method the interference immunity of which is high. The OFDM-CDMA method, into which these two methods are combined, spreads at least either of time and frequency directions by using a two-dimensional spread code with which spreading can be made in the time and the frequency directions. This method is recited, for example, in Patent Documents 1 and 2.

In a mobile communication, the state of a propagation path of a channel varies by situation. If the state of a propagation path becomes worse, a transmission characteristic or a system capacity degrades. With the conventional technique recited in Patent Document 1, a transmitting side sets spreading factors in time and frequency directions according to the state of a propagation path of a channel in order to prevent a transmission characteristic and a system capacity from degrading. For example, the spreading factor in the frequency direction is set to a smaller value as a maximum delay time in the propagation path becomes longer, so that orthogonality between spread codes is prevented from degrading. Additionally, the spreading factor in the time direction is set to a smaller value as a maximum Doppler frequency in the propagation path becomes higher, so that orthogonality between spread codes is prevented from degrading.

With the conventional technique recited in Patent Document 1, a spreading factor that differs by user (receiving side) is applied according to the state of a propagation path, or the same spreading factor is applied to a plurality of users, when a transmitting side transmits a pilot symbol or the like for estimating a channel.

If a different spreading factor is applied, spread codes the number of which is equal to that of users are required. As a result, the capacity of the entire system becomes small, leading to a decrease in the efficiency of using the system capacity.

Additionally, since power equivalent to the number of users is required, also power consumption becomes higher.

In the meantime, if the same spreading factor is applied, power consumption can be further reduced. This is because each user makes despreading with the same spreading factor. However, since the reception characteristic of each user differs depending on the state of each propagation path, it is very difficult to directly identify an optimum spreading factor for each user. Therefore, it is vital to enable a plurality of users to receive data with a spreading factor according to the state of each propagation path while keeping the efficiency of using the system capacity high.

Patent Document 1: Japanese Published Unexamined Patent Application No. 2003-46474
Patent Document 2: Japanese Published Unexamined Patent Application No. 2004-48117

SUMMARY OF THE INVENTION

An object of the present invention is to provide a technique for enabling a plurality of users to receive data with spreading factors according to the states of propagation paths while keeping the efficiency of using a system capacity high in a communication method, such as an OFDM-CDMA method, which makes spreading by using a two-dimensional spread code.

A spread code allocating method according to the present invention is a method for allocating a two-dimensional spread code, with which spreading is made in time and frequency directions, to each channel. With this method, spread codes at least one of the time and the frequency directions of which are mutually orthogonal, and with which despreading can be made with spreading factors that are smaller than original spreading factors in the respective directions are selected as selection targets, and a spread code to be allocated to each channel is determined from among the spread codes selected as the selection targets.

It is desirable that the above described allocation of a spread code to each channel is made by targeting a predetermined channel.

Despreading methods according to first to third modes of the present invention are methods for causing a receiving device that receives a symbol of a channel, which is spread with a spread code allocated with the above described spread code allocating method and transmitted, to despread the symbol. These methods respectively cause the receiving device to despread the symbol as follows.

With the despreading method according to the first mode, received symbols of the same channel are despread respectively with a plurality of spreading factors including at least one of spreading factors in the time and the frequency directions, which is smaller than an original spreading factor, and a spreading factor used to despread a symbol of a channel different from the same channel is determined from results of despreading made respectively.

It is desirable that the above described same channel is a channel on which a pilot symbol is transmitted. Additionally, it is desirable to update the determined spreading factor depending on need based on a pilot symbol received after the determination. Or, it is desirable to update the symbol of the different channel based on a result of despreading made with the spreading factor. Furthermore, it is desirable to identify the moving velocity of the receiving device as opposed to a transmitting device that transmits the symbol of the channel, and to update the determined spreading factor depending on need based on a result of the identification. Still further, it is desirable to update the determined spreading factor depending on need based on a delay spread detected by the different channel.

With the despreading method according to the second mode, a result of despreading the received symbol of the channel is monitored, and a spreading factor, with which the received symbol of the channel is despread, is changed based on a result of the monitoring.

It is desirable that the result of the monitoring is a delay spread.

With the despreading method according to the third mode, the moving velocity of a receiving device as opposed to a transmitting device that transmits a symbol of a channel is identified, and a spreading factor used to despread the received symbol of the channel is changed depending on need based on a result of the identification.

A transmitting device according to the present invention is assumed to be able to multiplex and transmit a plurality of channels by using a two-dimensional spread code with which spreading is made in time and frequency directions. The transmitting device comprises code allocating unit for allocating spread codes, at least one of the time and the frequency directions of which are mutually orthogonal and with which despreading can be made with spreading factors that are smaller than original spreading factors in the respective directions, to each channel, and transmitting unit for spreading a symbol of each channel by using the spread codes allocated by the code allocating unit, and for transmitting the symbol.

A communicating device according to the first mode comprises the above described transmitting device. A communicating device according to the second mode further comprises, in addition to its configuration, receiving unit that can receive spreading factor information, which indicates a spreading factor set to despread at least one of symbols of a channel and a different channel, from the communicating device that transmits the symbol of the channel, and controlling unit for controlling allocation of a spread code to each channel, which is made by the code allocating unit, based on the spreading factor information received by the receiving unit.

It is desirable that the above described receiving unit receives the symbol of the channel, which is spread with the spread code and transmitted, and despreads the symbol. Additionally, it is desirable that the controlling unit dynamically updates the spreading factor that the receiving unit uses to despread the symbol of the channel. It is desirable that the spreading factor that the receiving unit uses to despread the symbol of the channel can be reflected on the allocation of a spread code, which is made by the code allocating unit.

A wireless base station device according to the first mode comprises the transmitting device according to the above described first preferred embodiment.

Receiving devices according to the first to fifth modes are assumed to be able to receive a symbol of a channel, which is spread and transmitted by the transmitting device according to the above described first mode, and respectively comprises the following units.

The receiving device according to the first mode comprises receiving unit that can receive a symbol of a channel, a plurality of despreading unit for respectively despreading symbols of the same channel, which are received by the receiving unit, with mutually different spreading factors including at least one of spreading factors in the time and the frequency directions, which is smaller than an original spreading factor, different despreading unit for despreading a symbol, which is received by the receiving unit, of a channel different from the same channel, and controlling unit for setting a spreading factor that the different despreading unit uses for despreading based on results of despreading made respectively by the plurality of despreading unit.

It is desirable that the controlling unit updates the spreading factor that the different despreading unit uses for despreading based on a result of despreading made by the different despreading unit.

The receiving device according to the second mode further comprises, in addition to the configuration according to the above described first mode, velocity identifying unit for identifying the moving velocity of the receiving device as opposed to a transmitting device that transmits the symbol of the channel, and the controlling unit updates a spreading factor that the different despreading unit uses for despreading based on the moving velocity identified by the velocity identifying unit.

A communicating device according to the third mode comprises the receiving device according to the above described first mode, and the controlling unit causes transmitting unit to transmit information indicating the spreading factor that the different despreading unit uses for despreading. It is desirable that the transmitting unit spreads the information by using a two-dimensional spread code, and transmits the information.

A receiving device according to the third mode comprises receiving unit that can receive a symbol of a channel, despreading unit for despreading the symbol of the channel, which is received by the receiving unit, and controlling unit for dynamically updating a spreading factor that the despreading unit uses for despreading.

It is desirable that the above described controlling unit updates the spreading factor that the despreading unit uses for despreading based on a result of despreading made by the despreading unit.

A receiving device according to the fourth mode further comprises, in addition to the configuration according to the above described third mode, velocity identifying unit for identifying the moving velocity (or Doppler shift) of the receiving device as opposed to a transmitting device that transmits the symbol of the channel, and the controlling unit updates the spreading factor that the despreading unit uses for despreading based on the moving velocity (or Doppler shift) identified by the velocity identifying unit.

A communicating device according to the fourth mode comprises the receiving device according to the above described third mode, and the controlling unit causes transmitting unit to transmit information indicating the spreading factor that the despreading unit uses for despreading. It is desirable that the transmitting unit spreads the information by using a two-dimensional spread code, and transmits the information.

A receiving device according to the fifth mode comprises receiving unit that can receive a symbol of a channel, despreading unit for despreading the symbol of the channel, which is received by the receiving unit, velocity identifying unit for identifying the moving velocity of the receiving device as opposed to a transmitting device that transmits the symbol of the channel, and controlling unit for dynamically updating the spreading factor that the despreading unit uses for despreading based on the moving velocity identified by the velocity identifying unit.

A communicating device according to the fifth mode comprises the receiving device according to the above described fifth mode, and the controlling unit causes transmitting unit to transmit information indicating the spreading factor that the despreading unit uses for despreading. It is desirable that the transmitting unit spreads the information by using a two-dimensional spread code, and transmits the information.

Mobile terminals according to the first to the third modes of the present invention comprise the receiving devices according to the first, the third, and the fifth modes, respectively.

According to the present invention, two-dimensional spread codes at least one of time and frequency directions of which are mutually orthogonal, and with which despreading can be made with spreading factors that are smaller than original spreading factors in the respective directions are recognized as selection targets, and a spread code to be allocated to each channel is determined from among the spread codes recognized as the selection targets. Since a symbol of a channel is spread with a spread code allocated in such a way, a receiving side can despread the symbol with a plurality of spreading factors all the time. As a result, an environment where despreading can be made by selecting a more suitable spreading factor according to the state of a propagation path is realized.

Because a received symbol can be despread with a plurality of spreading factors, a plurality of users (receiving devices) can select a spreading factor based on results of the despreading from one channel. A suitable selection (including an update) of a spreading factor can be dynamically made depending on need by also focusing attention, for example, on another factor, which exerts an influence on the state of a propagation path, such as the moving velocity of a receiving side as opposed to the transmitting side of the symbol in addition to the results of despreading. Therefore, despreading can be made with a spreading factor more suitable for the state of a propagation path, and also the efficiency of using a system capacity can be kept high all the time. If the state of a propagation path, which is verified or estimated on a receiving side, is notified to a transmitting side and reflected on the allocation of a spread code, a spread code more suitable for the state of the propagation path can be securely allocated to the receiving side. Accordingly, a result of despreading, namely, a reception characteristic can be securely kept high all the time.

BRIEF DESCRIPTION OF THE DRAWINGS

FIG. 1 is a schematic explaining code domains of two-dimensional spread codes adopted in a preferred embodiment;

FIG. 2A is a schematic explaining a method for extracting a portion from a two-dimensional spread code (in a case of SF1×4);

FIG. 2B is a schematic explaining a method for extracting a portion from the two-dimensional spread code (in a case of SF4×4);

FIG. 2C is a schematic explaining a method for extracting a portion from the two-dimensional spread code (in a case of SF2×2);

FIG. 3 is a schematic explaining a method for allocating a two-dimensional spread code according to the preferred embodiment;

FIG. 4 is a schematic explaining a two-dimensional spread code to be allocated to another channel, when two-dimensional spread codes are allocated to 2 channels;

FIG. 5 is a schematic explaining a two-dimensional spread code to be allocated to another channel, when two-dimensional spread codes are allocated to 3 channels;

FIG. 6 is a block diagram explaining a configuration of a communicating device according to a first preferred embodiment;

FIG. 7 is a block diagram explaining configurations of a spread code generating unit and a two-dimensional spreading unit;

FIG. 8 is a schematic (No. 1) explaining an example of contents of a spread code allocation table;

FIG. 9 is a schematic (No. 2) explaining an example of contents of a spread code allocation table;

FIG. 10 is a schematic explaining a relationship between each channel in the spread code allocation table shown in FIG. 8 and a code domain occupied by a two-dimensional spread code to be allocated to the channel;

FIG. 11 is a flowchart showing a spread code allocation table generation process;

FIG. 12 is a block diagram explaining a configuration of a communicating device that communicates with the communicating device shown in FIG. 6;

FIG. 13 is a block diagram explaining a configuration of a pilot despreading unit shown in FIG. 12;

FIG. 14 is a schematic explaining an update unit of a spreading factor;

FIG. 15 is a schematic explaining transitions among spreading factors, which occur with an update of a spreading factor;

FIG. 16 is a block diagram explaining a configuration of a communicating device according to a second preferred embodiment;

FIG. 18 is a block diagram explaining a configuration of a communicating device according to a third preferred embodiment;

FIG. 22A is a schematic explaining an example of allocation of spreading factors in the sixth preferred embodiment (in a case of SF4×1);

FIG. 22C is a schematic explaining an example of allocation of spreading factors in the sixth preferred embodiment (in a case of SFN×4 (N=1, 2, 4))

DESCRIPTION OF THE PREFERRED EMBODIMENTS

Figure 17:
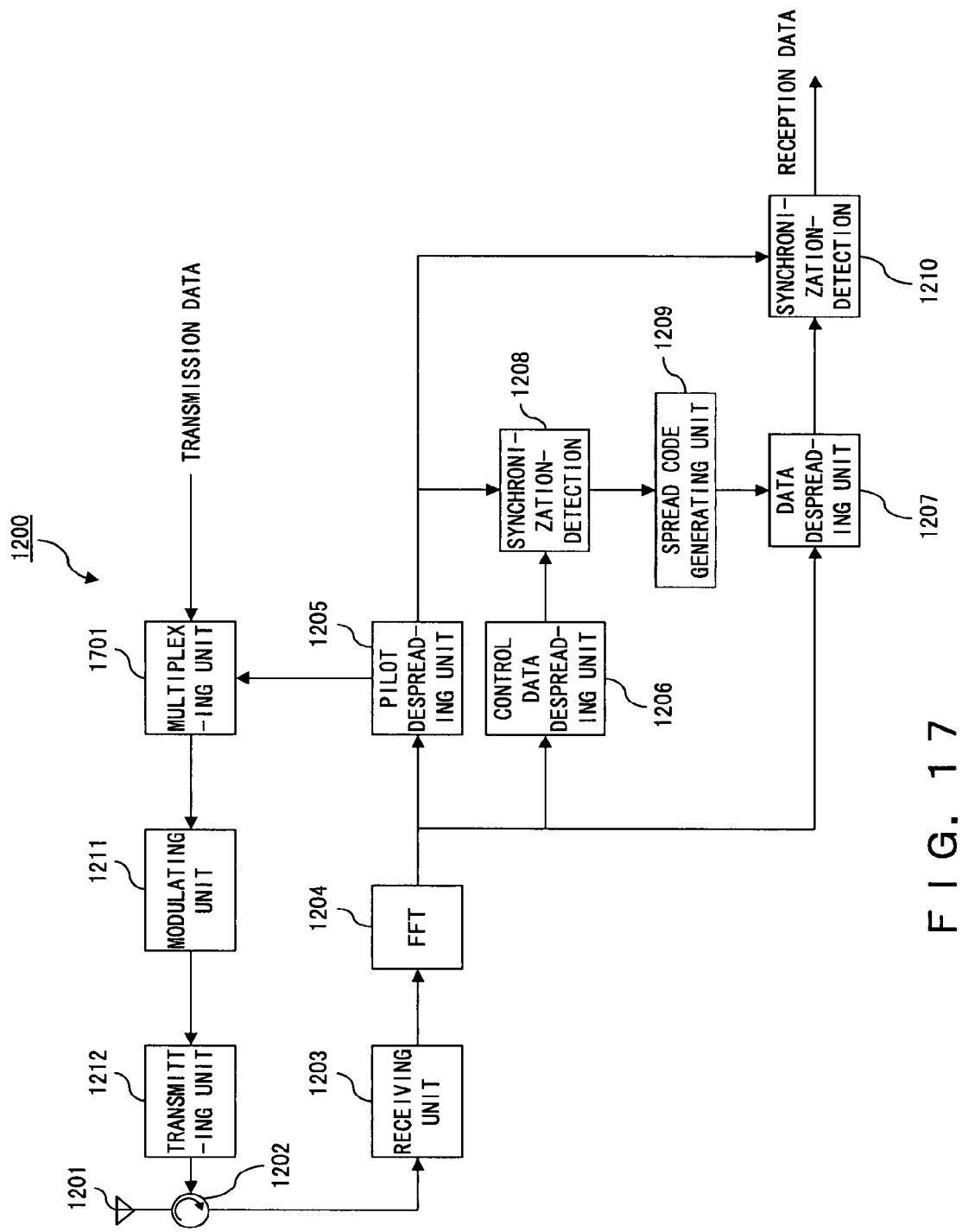
FIG. 17 is a block diagram explaining a configuration of a communicating device that communicates with the communicating device shown in FIG. 16.

Preferred embodiments according to the present invention are hereinafter described in detail with reference to the drawings.

<First Preferred Embodiment>

FIG. 1 is a schematic explaining the code domains of two-dimensional spread codes adopted in this preferred embodiment.

The code domains are those implemented when maximum spreading factors in both time and frequency directions are assumed to be 16. As a spread code, a code that is orthogonal even if despreading is made with spreading factors which are different from the original spreading factors (the spreading factors that a transmitting side uses for spreading) in both the time and the frequency directions is adopted. Such a spread code can be generated by using an OVSF (Orthogonal Variable Spreading Factor) code. Prior to the explanation about FIG. 1, a spread code generated by using the OVSF code is specifically described.

As is known, as the OVSF code, a code having a twofold length is sequentially generated with the following equation (1).

$$\begin{bmatrix} C_{2^{(n+1)},0} \\ C_{2^{(n+1)},1} \\ C_{2^{(n+1)},2} \\ C_{2^{(n+1)},3} \\ \vdots \\ C_{2^{(n+1)},2^{(n+1)}-2} \\ C_{2^{(n+1)},2^{(n+1)}-1} \end{bmatrix} = \begin{bmatrix} C_{2^n,0} & C_{2^n,0} \\ C_{2^n,0} & -C_{2^n,0} \\ C_{2^n,1} & C_{2^n,1} \\ C_{2^n,1} & -C_{2^n,1} \\ \vdots & \vdots \\ C_{2^n,2^n-1} & C_{2^n,2^n-1} \\ C_{2^n,2^n-1} & -C_{2^n,2^n-1} \end{bmatrix} \quad (1)$$

The code generated with this equation (1) has a nature such that orthogonality is maintained if the code is not derived from the same tree, not only in codes having the same length but also in codes having different lengths.

The spread code (OVSF code) for making two-dimensional spreading can be represented as follows.

$$C_{m,k} \times C_{n,l}$$

where $C_{m,k}$ and $C_{n,l}$ respectively represent spread codes in time and frequency directions. Their subscripts represent a spreading factor (also referred to as SF hereinafter) and a code number. For example, "m,j" represents a jth spread code having a spreading factor m. "×" here represents a Kronecker product (direct product) of a matrix. Its specific example is provided below.

$$C_{4,3} \times C_{4,1} = \begin{bmatrix} 0 \\ 1 \\ 1 \\ 0 \end{bmatrix} \times [0 \quad 0 \quad 1 \quad 1] = \begin{bmatrix} 0 & 0 & 1 & 1 \\ 1 & 1 & 0 & 0 \\ 1 & 1 & 0 & 0 \\ 0 & 0 & 1 & 1 \end{bmatrix} \quad (2)$$

Normally, a row direction (horizontal direction) and a column direction (vertical direction) are represented as a frequency axis and a time axis respectively in the matrix notation of a two-dimensional spread code. The multiplication is made by using 2 as a modulus. In the matrix of 4×4 in the equation (2), a transposition symbol is omitted. The equation (2) represents that one symbol after being spread is configured with a total of 16 (=4×4) chips in the two-dimensional spread code configured with spread codes having spreading factors in the time and the frequency directions, which are respectively 4. The relationship between the spreading factors in the time and the frequency directions in the spread code is denoted as "SF4×4". "4" preceding "×" and "4" succeeding "×" represent the spreading factors in the time and the frequency directions respectively. Also a relationship between other spreading factors is represented with the same notation.

Different spread codes $C_{m1,k1} \times C_{n1,l1}$ and $C_{m2,k2} \times C_{n2,l2}$ are orthogonalized if at least either of relationships $C_{m1,k1} \perp C_{m2,k2}$ and $C_{n1,l1} \perp C_{n2,l2}$ is satisfied. Namely, if at least either of the time and the frequency directions are orthogonal, the spread codes become orthogonal as a whole.

The code domain of a spread code generated by using an OVSF code becomes specific according to the spreading factor and the code number of the spread code. FIG. 1 shows the relationships between spread codes respectively adopted in the time and the frequency directions and their code domains. By way of example, for a two-dimensional spread code $C_{8,6} \times C_{4,0}$, spread codes in the time and the frequency directions are $C_{8,6}$ and $C_{4,0}$ respectively. Therefore, this two-dimensional spread code occupies the code domain corresponding to these codes. As the spreading factors become larger in the vertical and the horizontal axes, the range occupied in the code space becomes smaller. Therefore, also the code domain becomes smaller.

To enable not only the entire two-dimensional spread code (chip) but also its extracted portion to be orthogonalized with another two-dimensional spread code, it is sufficient to recognize the portion desired to be extracted from the spread code as 1 two-dimensional spread code, and to generate a two-dimensional spread code so that the two-dimensional spread codes become mutually orthogonal. The two-dimensional spread code recognized as the portion desired to be extracted is equivalent to a code having a spreading factor that is made smaller than either of the original spreading factors in the time and the frequency directions of the two-dimensional spread code used for spreading.

Figure 2:
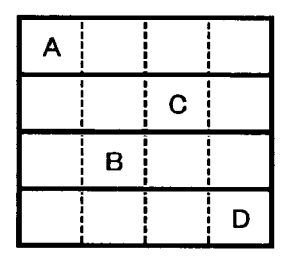
Figure 2A:
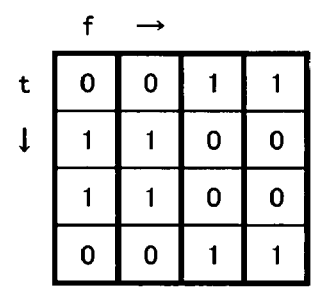
Figure 2B:
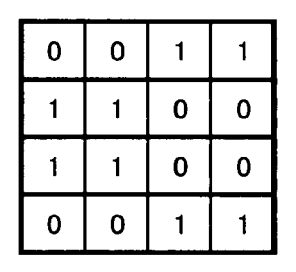
Figure 2C:
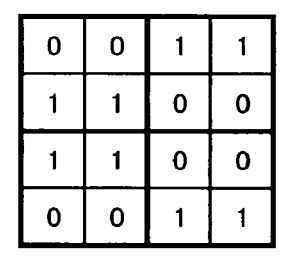

For example, a two-dimensional spread code $C_{4,3} \times C_{4,1}$ is a spread code having spreading factors in the time and the frequency directions, which are respectively 4, namely, SF 4×4. For such a two-dimensional spread code, its portion is considered to be extracted as a spread code of SF1×4, SF4×1, or SF2×2 as shown in FIGS. 2A to 2C. Therefore, if a plurality of channels are multiplexed by using a two-dimensional spread code that is orthogonal to any of the extracted portions of the spread code, it is sufficient to select a spread code that satisfies all of the following three conditions.

1. Orthogonal to the spread code $C_{4,3}$ in the time direction (condition 1).
2. Orthogonal to the spread code $C_{4,1}$ in the frequency direction (condition 2).
3. Orthogonal to the two-dimensional spread code $C_{2,1} \times C_{2,0}$ in a two-dimensional domain of the time and the frequency directions (condition 3).

FIG. 3 is a schematic explaining a method for allocating a two-dimensional spread code according to this preferred embodiment. In FIG. 3, a two-dimensional spread code to be allocated to another channel is represented as a code domain when only $C_{4,3} \times C_{4,1}$ is allocated as a two-dimensional spread code.

In FIG. 3, a domain A4 enclosed with a broken line is a domain where a spread code in the time direction is $C_{4,3}$, and a domain A3 enclosed with a dotted line is a domain where a spread code in the frequency direction is $C_{4,1}$. The domain A4 does not satisfy the condition 1, whereas the domain A3 does not satisfy the condition 2. A domain A1 enclosed with a solid line is a domain where a two-dimensional spread code is $C_{2,1} \times C_{2,0}$, and this domain does not satisfy the condition 3.

The spread code $C_{4,1}$ in the frequency direction is generated from a spread code $C_{2,0}$ having a spreading factor 2. Therefore, the spread code $C_{2,0}$ is a spread code in a layer higher than the spread code $C_{4,1}$. As a result, for the two-dimensional spread code having a code domain in the domain A4, despreading can be made with the spread code $C_{4,3} \times C_{2,0}$, namely, the spreading factor of SF4×2. Similarly, for the two-dimensional code having a code domain in the domain A3, despreading can be made with the spread code $C_{2,1} \times C_{4,1}$. For the spread code having a code domain in the domain Al, despreading can be made with any of the spread codes $C_{4,3} \times C_{2,0}$ and $C_{2,1} \times C_{4,1}$.

Domains corresponding to portions other than these domains, namely, domains A2 represented with oblique lines are orthogonal to not only the two-dimensional spread code $C_{4,3} \times C_{4,1}$ but also the spread codes of SF1×4, SF4×1, and SF2×2, which are extracted from the two-dimensional spread code (FIGS. 2A-2C). In addition, the domains A2 are also orthogonal to the spread codes of SF2×4 and SF4×2.

In this way, a two-dimensional spread code that satisfies all of the conditions 1 to 3 can be allocated to each channel used to transmit a symbol (data).

FIG. 4 is a schematic explaining a two-dimensional spread code to be allocated to another channel when two-dimensional spread codes are allocated to 2 channels. In FIG. 4, $C_{8,0} \times C_{8,0}$ and $C_{8,2} \times C_{8,1}$ are allocated as two-dimensional spread codes. Domains B1 and B3 correspond to their code domains.

A domain B2 enclosed with a solid line includes the domain B1, and does not satisfy the condition 3 here. Similarly, a domain B6 enclosed with a solid line includes the domain B3, and does not satisfy the condition 3. A domain B4 including the domain B1, and a domain B5 including the domain B3 do not satisfy the condition 2 respectively. A domain B7 including the domain B1, and a domain B8 including the domain B3 do not satisfy the condition 1 respectively. Therefore, only a two-dimensional spread code having a code domain within a domain B9 represented with oblique lines is a target to be allocated to another channel.

FIG. 5 is a schematic explaining a two-dimensional spread code to be allocated to another channel when two-dimensional spread codes are allocated to 3 channels. In FIG. 5, $C_{8,1} \times C_{8,2}$ is further allocated as a two-dimensional spread code in the state shown in FIG. 4.

In FIG. 5, domains C1 and C2 respectively correspond to the domains B1 and B3 in FIG. 4. A domain C3 corresponds to the code domain of the two-dimensional code $C_{8,1} \times C_{8,2}$. A domain C4 not to be allocated due to the domain C1 is represented with vertical lines. Similarly, a domain C5 not to be allocated due to the domain C2 is represented with horizontal lines, and a domain C6 not to be allocated due to the domain C3 is represented with oblique lines. A domain C7 within the domain C4 is a domain not to be allocated due to the domains C1 and C3. Similarly, a domain C8 is excluded from targets to be allocated due to the domains C1 and C2, and a domain C9 is excluded from targets to be allocated due to the domains C1-C3. As a result, a two-dimensional spread code having a code domain within a domain C10, which is represented with oblique lines different from the domain C6, becomes a target to be allocated to another channel.

As described above, the transmitting side allocates a two-dimensional spread code to each channel. Such allocation is made, whereby a receiving (user) side can not only despread the received symbol of a channel with the original spreading factors both in the time and the frequency directions, but also despread the symbol even with at least either of the spreading factors, which is smaller than the original one, all the time. Accordingly, the receiving side can securely despread a reception symbol with a more suitable spreading factor according to the state of a propagation path. This unit that the reception symbol can be detected (restored) with high accuracy, namely, the reception characteristic can be kept high all the time.

A spreading factor used for despreading can be changed on the receiving side, thereby eliminating the need for transmitting a pilot symbol or the like for estimating a channel to each receiving side. Accordingly, also the efficiency of using a system capacity can be kept high all the time.

FIG. 6 is a block diagram explaining a configuration of a communicating device according to the first preferred embodiment. The communicating device 60 is equipped with a transmitting device that allocates a two-dimensional spread code as described above. This communicating device is applied, for example, to a wireless base station device. The communicating device 60 is described in detail next with reference to FIG. 6.

In data (symbol) to be transmitted, a pilot symbol and control data normally exist in addition to data to be transmitted/received between users. The pilot symbol is shared by users because a spreading factor that is different by user is not required to be applied. The pilot symbol and the data are once stored in a buffer 612, and output to a multiplexing unit 601.

The multiplexing unit 601 multiplexes, for example, input data, and converts the multiplexed data into a data string of each channel. A spread code generating unit 602 respectively generates spread codes in the time and the frequency directions. To a two-dimensional spreading unit 603, the spread codes from the spread code generating unit 602, and the data string from the multiplexing unit 601 are input for each channel. Then, the two-dimensional spreading unit 603 spreads the data string input from the multiplexing unit 601 for each channel by using the input spread codes.

FIG. 7 is a block diagram explaining configurations of the spread code generating unit 602 and the two-dimensional spreading unit 603.

As shown in FIG. 7, the spread code generating unit 602 comprises an F spread code allocating unit 721 for generating a spread code in the frequency direction for each channel, and a T spread code allocating unit 722 for generating a spread code in the time direction for each channel. The two-dimensional spreading unit 603 comprises a plurality of spread modulating units 701 for spread-modulating data in units of channels, by F spread unit 711 and a plurality of T spread units 712, by using spread codes in the frequency and the time directions, a plurality of adding units 702 for adding data after being spread-modulated, which is output from each of the plurality of spread modulating units 701, in units of subcarriers, and an IFFT (Inverse Fast Fourier Transform) unit 703, to which data after being added is input from each of the plurality of adding units 702, for performing IFFT. As a result, the two-dimensional spreading unit 603 outputs to a transmitting unit 604 a signal into which the data after being spread-modulated of channels are multiplexed.

The transmitting unit 604 puts the signal input from the two-dimensional spreading unit 603 on a carrier wave, and outputs the signal after amplifying it. The output analog signal is transmitted via a shared device 605 and an antenna 606.

In the meantime, a signal received by the antenna 606 is output to a receiving unit 607 via the shared device 605, and extracted as a digital signal. The extracted reception signal is demodulated by a demodulating unit 608, and output to a detecting unit 609 and a propagation path estimating unit 610. The detecting unit 609 makes detection by using the demodulated reception signal, and outputs its result as reception data. Here, it is assumed that the transmitting (user) side (FIG. 12) does not make spreading using a two-dimensional code.

The propagation path estimating unit 610 estimates the state of a propagation path for each channel according to, for example, the reception level, the fading, etc. of the demodulated reception signal, and outputs the estimation result to a spreading factor controlling unit 611. The spreading factor controlling unit 611 determines a spread code to be allocated to each channel according to the estimation result, and causes the spread code generating unit 602 to generate the code. Additionally, the spreading factor controlling unit 611 outputs information (code information) indicating the allocated spread code, and its spreading factors to the buffer 612 as control data. Then, these items of information are transmitted to the receiving side in the form of the control data.

The spreading factor controlling unit 611 determines a spread code to be allocated to each channel by referencing, for example, a spread code allocation table shown in FIG. 8 or 9. Such a table is stored in a nonvolatile memory provided inside.

In FIGS. 8 and 9, a channel having the best state of a propagation path (a channel the communication speed of which is the highest) corresponds to data A, whereas a channel having the worst state corresponds to data C. Therefore, the spreading factor controlling unit 611 can allocate an optimum two-dimensional spread code according to the state of a propagation path to each channel even if it references any of the tables shown in FIGS. 8 and 9. The table shown in FIG. 8 provides a summary of two-dimensional spread codes to be allocated to respective channels, whereas the table shown in FIG. 9 provides a summary of two-dimensional spread codes by restricting spreading factors to be allocated to respective channels. The tables respectively shown in FIGS. 8 and 9 are merely one example, and their contents maybe determined depending on need. For example, the numbers of channels (pilot channels) on which a pilot symbol is transmitted, channels (control data channels) on which control data is transmitted, and channels (data channels) on which data is transmitted, two-dimensional spread codes allocatable to these channels, and the like may be arbitrarily determined.

FIG. 10 is a schematic explaining a relationship between each channel in the table shown in FIG. 8 and a code domain occupied by a two-dimensional spread code to be allocated to the channel. As is evident from FIG. 10, all channels are mutually orthogonal. A channel on which a shared pilot symbol is transmitted is orthogonal to all of the other channels even if despreading is made with any of SF1×4, SF2×2, and SF4×1 in addition to SF4×4. This is similar in the table shown in FIG. 9. In FIGS. 8 to 10, the spreading factor and the code number of a spread code are denoted within parentheses.

FIG. 11 is a flowchart showing a spread code allocation table generation process.

A channel (pilot channel) on which a pilot symbol is transmitted must be secured all the time. Therefore, it is desirable to reduce a code domain occupied by the pilot channel to a minimum. The generation process shown in FIG. 11 is intended to create a table in consideration of this fact. For example, a computer (data processing device) is made to activate a program developed to create a table, whereby this process is executed. "N" in FIG. 11 indicates the total number of pilot channels.

Initially, in step S1, an arbitrary spread code is selected from a set U of two-dimensional spread codes having a required spreading factor as a pilot channel and allocated to the first pilot channel, and 1 is substituted to a variable n. In the next step S2, it is determined whether or not the value of the variable n is equal to or smaller than the total number N. If the value of the variable n is larger than the total number N, the determination results in No, and the series of processes is terminated. Otherwise, the determination results in Yes, and the flow proceeds to step S3.

In step S3, the entire code domain occupied by allocated pilot channels is calculated. In the next step S4, all of spread codes contiguous to the calculated code domain in the code space are extracted from among spread codes yet to be allocated, which belong to the set U, the entire code domain occupied when extracted spread code is allocated to a pilot channel is calculated for each extracted spread code, a spread code the calculated domain of which is the smallest is allocated to an nth pilot channel, and the value of the variable n is incremented. Thereafter, the flow goes back to the above described step S2. In this way, a two-dimensional spread code can be sequentially allocated to each pilot channel so that the entire code domain becomes the smallest.

In this preferred embodiment, a spread code allocated to another channel except for a pilot channel is dynamically changed by referencing the spread code allocation table shown in FIG. 8 or 9. However, a spread code allocated to each channel may be dynamically changed without referencing such a table. Such a change can be made by applying, for example, the algorithm adopted by the spread code allocation table creation process shown in FIG. 11. This application may be, for example, an application such that two-dimensional spread tables to be allocated according to the state of an estimated propagation path are restricted, and a two-dimensional spread table the entire code domain of which becomes the smallest maybe extracted from among the restricted two-dimensional spread tables, and allocated.

FIG. 12 is a block diagram explaining a configuration of a communicating device that communicates with the communicating device shown in FIG. 6. The communicating device 1200 is, for example, a mobile terminal device carried by a user. The communicating device 60, which is assumed to be stationarily installed for the sake of convenience, is hereinafter referred to as a wireless base station device, whereas the communicating device 1200 that communicates with the wireless base station device is referred to as a mobile terminal device. The mobile terminal device 1200 is hereinafter abbreviated to a "mobile terminal".

A signal received by an antenna 1201 is output to a receiving unit 1203 via a shared device 1202, and extracted as a digital signal. An FFT (Fast Fourier Transform) unit 1204 performs FFT for the extracted reception signal to extract data for each subcarrier. Data of each subcarrier is output to a pilot despreading unit 1205, a control data despreading unit 1206, and a data despreading unit 1207 respectively.

The pilot despreading unit 1205 makes despreading for a pilot channel as a target, and the control data despreading unit 1206 makes despreading for a control data channel as a target in a similar manner. The data despreading unit 1207 makes despreading for a data channel as a target.

FIG. 13 is a block diagram explaining a configuration of the pilot despreading unit 1205.

As shown in FIG. 13, the pilot despreading unit 1205 comprises a plurality of pilot despreading units 1301 each of which makes despreading with a different spreading factor for a pilot channel as a target, and a selection controlling unit 1302, to which the result of the despreading is input from each of the plurality of pilot despreading units 1301, for selecting an optimum spreading factor. The selection controlling unit 1302 outputs, to a synchronization detecting unit 1208, a signal for synchronization-detection, which is calculated from the result of despreading made for a pilot with an optimum spreading factor, and information indicating the selected spreading factor. To the synchronization detecting unit 1210, only the signal for synchronization-detection is output.

The wireless base station device 60 on the transmitting side transmits code information and a spreading factor in the form of control data. The control data despreading unit 1206 outputs data after being despread to the synchronization detecting unit 1208. Then, these items of information are synchronization-detected by the synchronization detecting unit 1208 and extracted. These items of information are output to a spread code generating unit 1209.

The spread code generating unit 1209 recognizes the spread code and the spreading factor, which are used for despreading, from the information transmitted by the transmitting side as the control data. The data despreading unit 1207 despreads data by using the recognized spread code and spreading factor. Data resultant from the despreading is output to the synchronization detecting unit 1210, and synchronization-detected by using an optimum signal for synchronization detection, which is output from the selection controlling unit 1302. The original data extracted with the synchronization-detection is output as reception data.

Here, a method for changing a spreading factor used for despreading a pilot is described in detail.

FIG. 14 is a schematic explaining an update unit of a spreading factor. In this figure, a domain denoted with D indicates an update unit in a code space.

For a spreading factor, at least either of its time direction and frequency direction can be updated. The update unit D is intended to determine in which direction a spreading factor in either of the time direction and the frequency direction is to be updated. In the time direction, the spreading factor is updated, for example, according to the amount of change for a predetermined time period. In the frequency direction, the spreading factor is updated, for example, according to the amount of change occurred in a subcarrier of a different frequency at the same timing. As the amount of change, a phase, the dispersion of the amplitude of a signal, the dispersion of an SNR (Signal-to-Noise Ratio), etc. can be adopted.

FIG. 15 is a schematic explaining transitions among spreading factors, which occur with an update of a spreading factor. a-f denoted in this figure respectively indicate conditions under which a transition, along an arrow denoted with any of a-f, between spreading factors is to be made. Specifically, these conditions are as follows. Here, the contents of the conditions a-f are exemplified by denoting the amount of change in the time direction, the amount of change in the frequency direction, the upper limit of the amount of tolerable change in the time direction in a spreading factor being applied, its lower limit, the upper limit of the amount of tolerable change in the frequency direction in a spreading factor being applied, and its lower limit as g_SF, h_SF, Th(SF, U,t), Th(SF,L,t), Th(SF,U,f), and Th(SF,U,f). In the contents, the spreading factor being applied is denoted as SF. The spreading factor represented with SF is, for example, SF1×4. Their upper and lower limits of the amounts of change are preset as threshold values.

a: satisfies g_SF<Th (SF,L,t).
b: satisfies g_SF<Th (SF,U,t).
c: satisfies h_SF<Th (SF,U,f).
d: satisfies h_SF<Th (SF,L,f).
e: satisfies g_SF<Th (SF,L,t), and h_SF>Th (SF,U,f).
f: satisfies g_SF>Th (SF,U,t), and h_SF<Th (SF,L,f).

With these conditions, FIG. 17 represents that a transition is made to SF4×1 when the spreading factor being applied is SF2×2, for example, if the condition e is satisfied, so that the spreading factor in the time direction moves up one rank from 2 to 4, and the spreading factor in the frequency direction moves down one rank from 2 to 1. Similarly, this figure represents that a transition is made to SF4×2 if the condition a is satisfied, a transition is made to SF2×4 if the condition d is satisfied, and a transition is made to SF1×4 if the condition f is satisfied. Others are similar. The transitions must be made only if a spreading factor for which a transition is to be made exists.

Even if the spreading factor is updated as described above, despreading can be made with an optimum spreading factor. As a result, it is not necessary to despread pilot channels with a plurality of spreading factors.

The transitions shown in FIG. 15 may be applied when the above described allocation of a two-dimensional spread code is made to a target channel except for a pilot channel on the transmitting side (in the wireless base station) 60. In that case, it is sufficient to equip the spreading factor controlling unit 611 with a function to obtain the amounts of change g_SF and h_SF, and a function to determine a spreading factor for which a transition is to be made by comparing the amounts of change g_SF and h_SF, which are obtained with the above described function, with threshold values.

As the amount of change in the time direction, attention may be focused also on a delay spread. As the delay spread becomes smaller, the state of a propagation path in the frequency direction becomes better. Therefore, if attention is focused on the delay spread, it is desirable to update a spreading factor by giving a higher priority to the frequency direction as the delay spread becomes smaller. In this way, the reception characteristic can be kept high all the time.

The mobile terminal 1200 is assumed to be carried by a user. The state of a propagation path may vary also by moving velocity (a moving velocity relative to the wireless base station device 60 with which the mobile terminal 1200 makes a communication). The moving velocity can be estimated according to a change in the reception level of a signal, its fading, etc. also on the side of the mobile terminal 1200. Therefore, a spreading factor may be updated by focusing attention on the moving velocity. If the moving velocity is low, a sufficient spreading factor can be normally taken in the time direction. Accordingly, a smaller factor can be adopted as a spreading factor in the frequency direction. In the meantime, if the moving velocity is high, the state of a propagation path in the time direction becomes worse. Therefore, it is desirable to adopt a spreading factor that is smaller than the original one as a spreading factor in the time direction. Additionally, a spreading factor may be updated by focusing attention on some of the delay spread and the moving velocity.

Even if a spreading factor used for despreading is updated as described above, the reception characteristic can be kept higher, and the efficiency of using the system capacity can be kept high all the time. The wireless base station device 60 may be made to transmit also information about a spreading factor updated in this way.

<Second Preferred Embodiment>

In the above described first preferred embodiment, the wireless base station device 60 estimates the state of a propagation path from a reception signal. In the meantime, a mobile terminal notifies a wireless base station device of the state of a propagation path in the second preferred embodiment.

Most of configurations of the wireless base station device and the mobile terminal in the second preferred embodiment are fundamentally the same as those in the first preferred embodiment. Also their operations are similar. Therefore, constituent elements that are fundamentally the same as those in the first preferred embodiment are denoted with the same reference numerals, and only a portion different from the first preferred embodiment is described.

FIG. 16 is a block diagram explaining the configuration of the communicating device (wireless base station device) 60 according to the second preferred embodiment.

As described above, in the second preferred embodiment, the mobile terminal 1200 notifies the state of a propagation path. Therefore, a separating unit 1601 is arranged at a stage succeeding a detecting unit 609 as a replacement for a transmission path estimating unit 610.

The state of a propagation path is notified by using control data. The detecting unit 609 detects the data of each channel, and outputs its result to the separating unit 1601. The separating unit 1601 extracts the data of a control data channel, which is intended to notify the state of a propagation path, from the result, and outputs the extracted data to a spreading factor controlling unit 1602. Then, the state of the propagation path, which is detected on the side of the mobile terminal 1200, is reflected on the allocation of a spread code.

FIG. 17 is a block diagram explaining the configuration of the communicating device (mobile terminal) 1200 according to the second preferred embodiment.

In the second preferred embodiment, spreading factor information output by a pilot despreading unit 1205 is transmitted, whereby the state of a propagation path is notified to the wireless base station device 60. To implement this, the spreading factor information output by the pilot despreading unit 1205 is multiplexed with data by a multiplexing unit 1701.

The spreading factor information to be transmitted indicates optimum spreading factor information identified from the result of actually making despreading. Such spreading factor information is transmitted (fed back), whereby the wireless base station device 60 can allocate a two-dimensional spread code more suitably.

The spreading factor information may be transmitted only if a change occurs in a spreading factor. A selection controlling unit 1302 of the pilot despreading unit 1205 verifies whether or not a spreading factor selected from a newly received pilot channel is equal to a spreading factor selected so far, each time the pilot channel is received. If the factors differ, information about the spreading factor selected from the newly received pilot channel is output. As a result, the spreading factor used to despread a data channel is updated depending on need.

The state of a propagation path may be notified to the wireless base station device 60 by transmitting information different from the spreading factor information. Specifically, information about a spreading factor selected (updated) by focusing attention on a data channel, or information about a spreading factor selected (updated) by focusing attention on a delay spread or the moving velocity of the mobile terminal 1200 itself may be transmitted. Or, a plurality of items of the above described information may be transmitted.

<Third Preferred Embodiment>

In the above described first and second preferred embodiments, a data transmission from the mobile terminal 1200 to the wireless base station device 60 is made without using a two-dimensional spread code. In the third preferred embodiment, however, a two-dimensional spread code is used for a bidirectional data transmission.

FIG. 18 is a block diagram explaining a configuration of a communicating device according to the third preferred embodiment. The communicating device is that implemented when the communicating device (mobile terminal) 1200 shown in FIG. 17 is equipped with a function to make a data transmission by using a two-dimensional spread code. Therefore, constituent elements that are fundamentally the same as those shown in FIG. 17 are denoted with the same reference numerals. In the third preferred embodiment, spreading factor information output by a pilot despreading unit 1205 is directly input to a spread code generating unit 1209. The spread code generating unit 1209 generates a spread code specified with the input spreading factor information, and outputs the generated code to a two-dimensional spreading unit 1801 and a data despreading unit 1207. The data despreading unit 1207 despreads a control data channel and a data channel by using the spread code input from the spread code generating unit 1209.

The two-dimensional spreading unit 1801 spreads data by using the spread code input from the spread code generating unit 1209, and outputs the signal to a transmitting unit 1212 similar to the two-dimensional spreading unit 603 shown in FIG. 16. As a result, the signal is transmitted by the transmitting unit 1212 via a shared device 1202 and an antenna 1201.

In this way, in the third preferred embodiment, a result of despreading a pilot channel is reflected on the transmission of data. Since the state of the same propagation path is considered not to significantly vary depending on the direction of transmission of data, the receiving side of the signal can make despreading with suitable spreading factors even if the receiving side autonomously determines the spreading factors used to despread the signal.

<Fourth Preferred Embodiment>

In the third preferred embodiment, the communicating device (mobile terminal) 1200 shown in FIG. 17 is equipped with the function to make a data transmission by using a two-dimensional spread code. In the fourth preferred embodiment, for example, the wireless base station device 60 shown in FIG. 6 is equipped with a function to cope with data transmitted by using a two-dimensional spread code.

Figure 19:
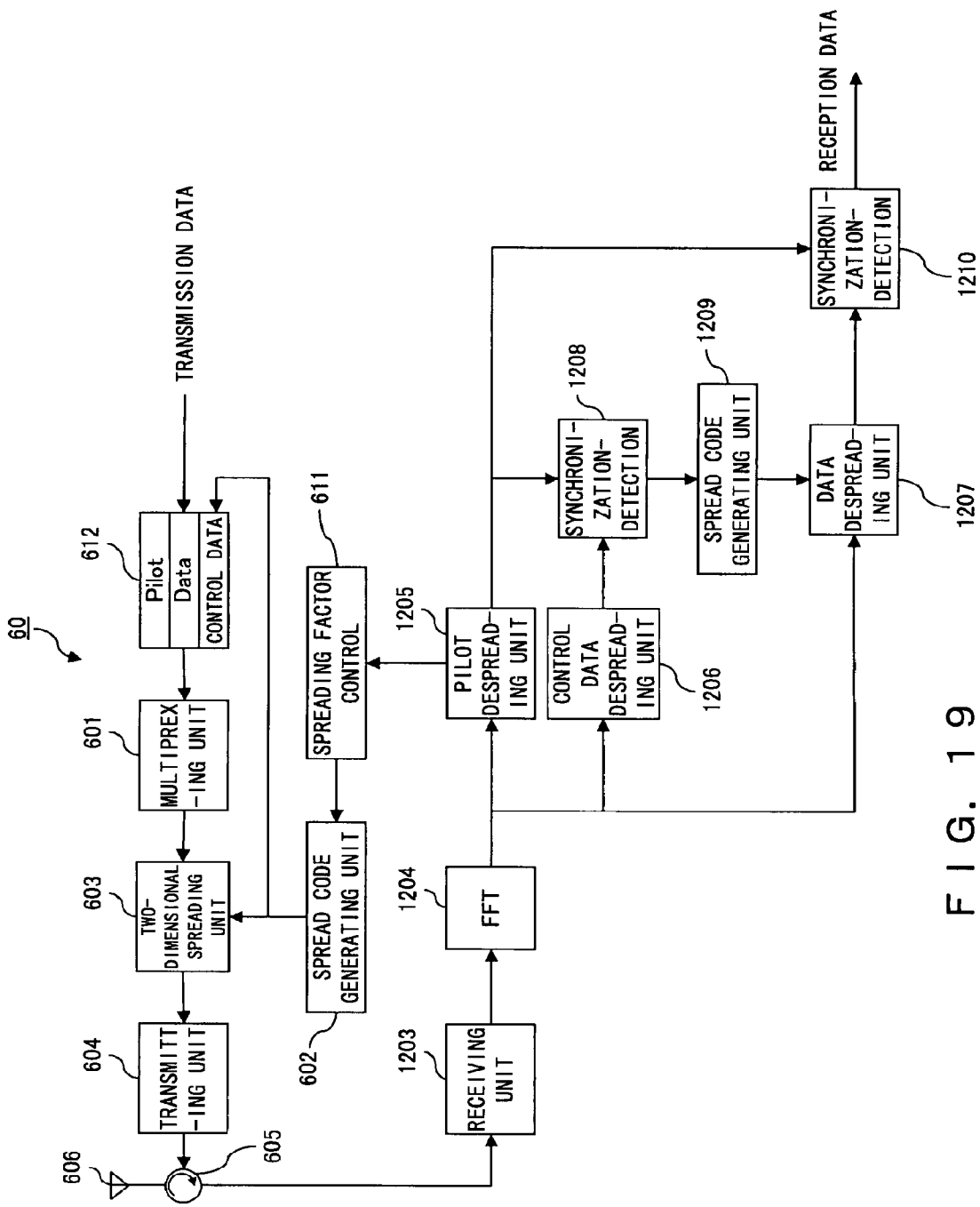
FIG. 19 is a block diagram explaining a configuration of a communicating device according to a fourth preferred embodiment.

FIG. 19 is a block diagram explaining a configuration of the communicating device (wireless base station device) 60 according to a fourth preferred embodiment.

As a function to receive data that is spread with a two-dimensional spread code and transmitted, for example, the constituent elements 1202-1210 shown in FIG. 12 can be adopted. Therefore, constituent elements that are fundamentally the same as those in FIG. 6 or 12 are denoted with the same reference numerals in FIG. 19.

As shown in FIG. 19, in the fourth preferred embodiment, a signal received by an antenna 606 is output to a receiving unit 1203 via a shared device 605. Spreading factor information output by a pilot despreading unit 1205 is output to a spreading factor controlling unit 611 as a replacement for a result of estimating the state of a propagation path by a propagation path estimating unit 610. Accordingly, as a two-dimensional spread code used to spread data, a code optimum for the state of the propagation path estimated by a mobile terminal that transmits the data can be allocated.

The mobile terminal maybe a terminal having the configuration shown in FIG. 18. Or, the mobile terminal may have a configuration where the spreading factor controlling unit 611 allocates a spread code according to a result of detection made by a synchronization detecting unit 1208 instead of spreading factor information input from the pilot despreading unit 1205. The communicating devices having the configurations shown in FIGS. 19 and 18 can be also assumed to communicate with other communicating devices having the same configurations. Such communicating devices include a transceiver.

<Other Preferred Embodiments>

Communication technology includes a variety of techniques for obtaining desired performance. Here, cases where representative communication techniques are applied, for example, to a transmitting device comprised by the wireless base station device (communicating device) 60 shown in FIG. 6 are described as preferred embodiments other than the above described ones. Constituent elements that are fundamentally the same as those shown in FIG. 6 are denoted with the same reference numerals.

Figure 20:
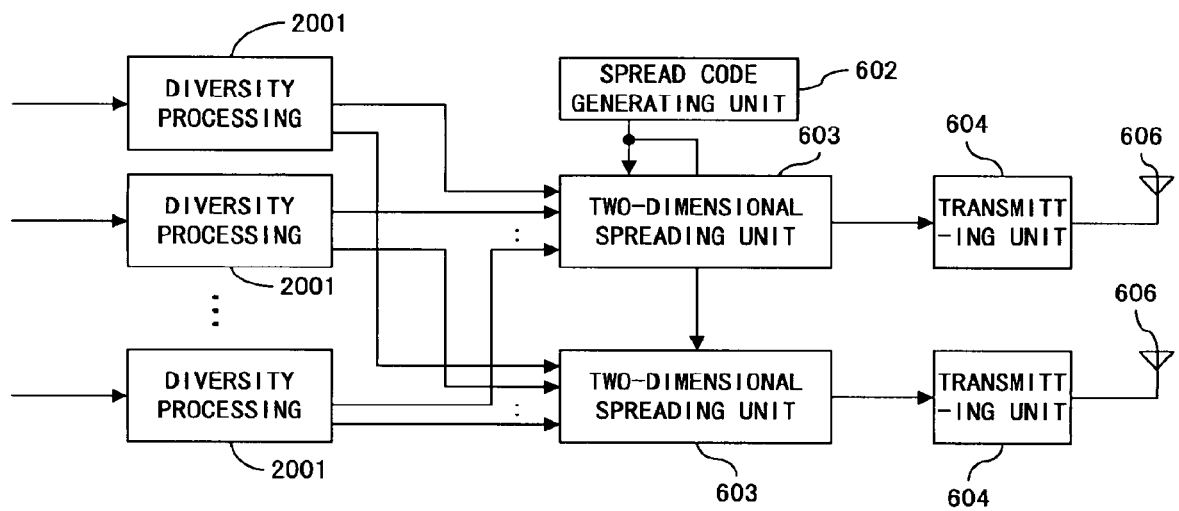
FIG. 20 is a block diagram explaining a configuration of a transmitting device according to a fifth preferred embodiment.

FIG. 20 is a block diagram explaining a configuration of a transmitting device according to a fifth preferred embodiment. The transmitting device is that implemented when a diversity transmission technique is applied.

In the fifth preferred embodiment shown in FIG. 20, the transmitting device comprises 2 two-dimensional spreading units 603, transmitting units 604, and 2 antennas 606. To each of the two-dimensional spreading units 603, data (symbol) is output from a diversity processing unit 2001 prepared, for example, for each channel. A spread code generating unit 602 outputs the same spread code to each of the two-dimensional spreading units 603 for the same data.

Each of the diversity processing units 2001, to which data is input from the multiplexing unit 601 shown in FIG. 6, converts the data into mutually orthogonal sequences, and outputs the data after being converted to each of the two-dimensional spreading units 603. Then, after each of the two-dimensional spreading units 603 spreads the same data (channel) with the same spread code, it outputs the data to each of the transmitting units 604. As a result, the same signals are transmitted from the separate antennas 606.

Figure 21:
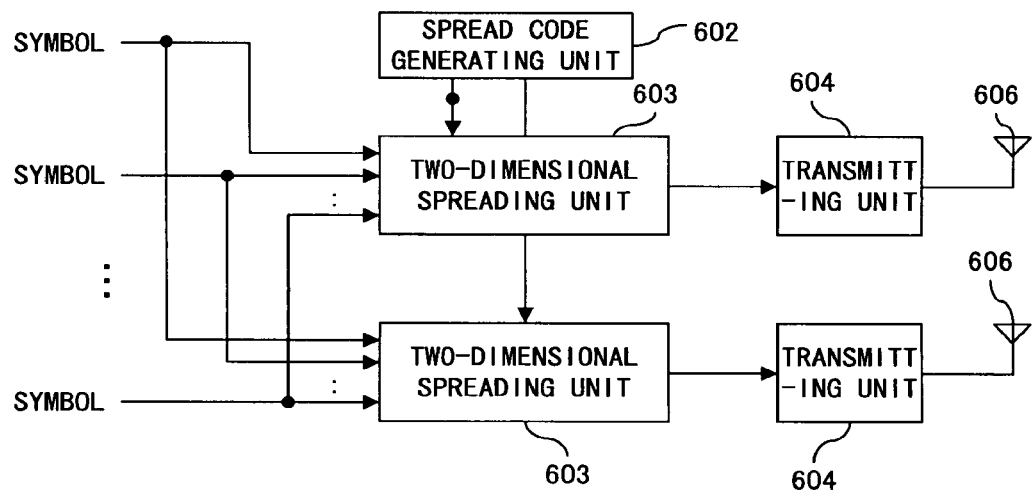
FIG. 21 is a block diagram explaining a configuration of a transmitting device according to a sixth preferred embodiment.

FIG. 21 is a block diagram explaining a configuration of a transmitting device according to a sixth preferred embodiment. The transmitting device is applied the diversity transmission technique by another method.

In the sixth preferred embodiment shown in FIG. 21, to each of two-dimensional spreading units 603, the same data is input from the multiplexing unit 601 shown in FIG. 6. Accordingly, a spread code generating unit 601 outputs mutually orthogonal spread codes for the same data to each of the two-dimensional spreading units 603. Such spread codes are output to each of the two-dimensional spreading units 603, thereby eliminating the need for providing the diversity processing units 2001 shown in FIG. 20.

Figure 22B:
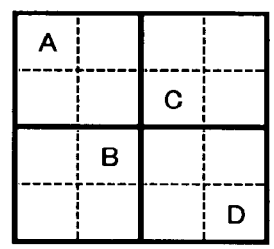
FIG. 22B is a schematic explaining an example of allocation of spreading factors in the sixth preferred embodiment (in a case of SF2×2)

In the configuration shown in FIG. 21, if a pilot channel (symbol) is shared by a plurality of users, a spread code that is orthogonal to other spread codes not only as an entire two-dimensional code but also as its extracted portion, namely, spread codes that satisfy all of the above described conditions 1-3 must be generated by the number of antennas 606 or more. By example, if a spread code of SF4×4 is considered, a maximum of 4 spread codes, which are orthogonal even if they are despread with any of spreading factors SF4×1, SF4×2, SF2×2, and SFN×4 (N=1,2,4), can be allocated at the same time as shown in FIGS. 22A-22C. A code domain is further enlarged or the number of spreading factors with which despreading can be made is further reduced, whereby the number of such spread codes can be further increased. A-D denoted in FIGS. 22A-22C indicate the code domains of the 4 allocatable spread codes.

Figure 23:
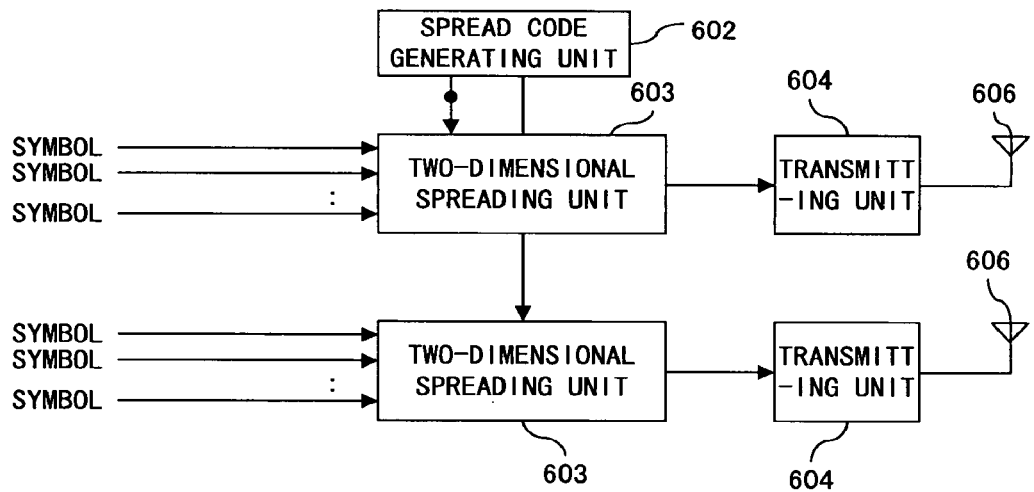
FIG. 23 is a block diagram explaining a configuration of a transmitting device according to a seventh preferred embodiment.

FIG. 23 is a block diagram explaining a configuration of a transmitting device according to a seventh preferred embodiment. This transmitting device is that implemented when an MIMO (Multiple Input and Multiple Output) technique is applied.

In the seventh preferred embodiment shown in FIG. 23, a multiplexing unit 601 splits data (symbol) into a plurality of sequences, and outputs the sequences to each of two-dimensional spreading units 603. Accordingly, if a pilot channel (symbol) is shared by a plurality of users in the same manner as in the sixth preferred embodiment, spread codes that are orthogonal to other spread codes not only as an entire two-dimensional spread code but also as its extracted portion, namely, spread codes that satisfy all of the above described conditions 1-3 must be generated by the number of antennas 606 or more.

Here, the other preferred embodiments implemented when the diversity transmission technique and the MIMO technique are applied are described as the fifth to the seventh preferred embodiments. However, a variety of other techniques can be applied.

What is claimed is:

1. A communication system, comprising:
   a transmitter that transmits a signal by using a two-dimensional spread code used for making a spread in time and frequency directions; and
   a receiver that receives the signal transmitted from the transmitter,
   wherein the transmitter includes;
   a selecting unit that selects spread codes in which at least one of the time and the frequency directions are mutually orthogonal, and
   a transmitting unit that spreads a signal by using the selected spread codes and transmits the signal,
   wherein the selected spread codes are able to be split in two or more parts each of which has a spreading factor that is made smaller than a spreading factor of respective selected spread codes in at least one of the time and the frequency directions, and each of which is mutually orthogonal with other selected spread codes in the at least one of the time and the frequency directions.

* * * * *